United States Patent Office 3,507,821
Patented Apr. 21, 1970

3,507,821
COATING COMPOSITION OF A POLYMER HAVING PENDENT ESTER GROUPS
Joseph A. Vasta, Woodbury, N.J., assignor to E. I. du Pont de Nemours and Company, Wilmington, Del., a corporation of Delaware
No Drawing. Original application Apr. 29, 1966, Ser. No. 546,189, now Patent No. 3,442,873, dated May 6, 1969. Divided and this application Nov. 21, 1968, Ser. No. 777,917
Int. Cl. C08f 21/02, 21/60
U.S. Cl. 260—31.2    19 Claims

ABSTRACT OF THE DISCLOSURE

A coating composition of a polymer having pendent ester groups formed by:
(1) Preparing an esterification product by reacting
(a) an anhydride of an ethylenically unsaturated dicarboxylic acid,
(b) a glycidyl ester,
(c) an aromatic or an aliphatic dicarboxylic acid; wherein (a), (b) and (c) are reacted in a molar ratio of 1:3:1,
(2) Copolymerizing the esterification product with other ethylenically unsaturated monomers to form a polymer.

CROSS REFERENCE TO RELATED APPLICATIONS

This is a divisional application of my copending application Ser. No. 546,189, filed Apr. 29, 1966 now Patent No. 3,442,873.

BACKGROUND OF THE INVENTION

This invention relates to a novel coating composition of a vinyl addition polymer that has attached to the polymer backbone pendent ester groups, and in particular, to novel thermosetting coating compositions formulated from this polymer.

There is a need for a coating composition for use as appliance finishes which has improved physical properties over the conventional finishes used for appliances, such as increased adhesion to metal substrates, excellent hardness and improved scratch and stain resistance.

The novel coating composition of this invention is especially suited for use in finishes for appliances, such as refrigerators, freezers, stoves, washing machines, dryers, and the like. The coating composition of this invention has excellent adhesion to metal substrates, good hardness and excellent scratch, mar and heat resistance and is resistant to grease, alkali detergents, chemical fumes and stains from foods, drugs and tobacco.

Thermosetting coating compositions of this invention can be applied by conventional equipment and cured at conventional baking temperatures while retaining the advantageous properties of the polymers. Also, the novel coating composition of this invention is compatible with conventional coating compositions of alkyd resins, thermosetting nitrogen containing resins, acrylic resins, nitrocellulose compositions and the like. An addition of only small amounts of the novel coating composition of this invention to these conventional coating compositions greatly improves the adhesion, hardness, scratch resistance and chemical resistance of these conventional coatings without a substantial increase in cost.

STATEMENT OF THE INVENTION

The novel coating composition of this invention has a polymer solids content of 10-90% by weight and a solvent for the polymer in which the polymer has ester groups pending from the polymer backbone and is formed by the following process:

Step (1), an esterification product is prepared by reacting the following ingredients:
(a) an anhydride of an ethylenically unsaturated dicarboxylic acid that has 4–6 carbon atoms;
(b) a glycidyl ester of the formula

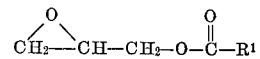

in which $R^1$ is a saturated aliphatic hydrocarbon radical having 5–17 carbon atoms or an unsaturated hydrocarbon radical having 12–18 carbon atoms;
(c) an aromatic dicarboxylic acid or a saturated aliphatic dicarboxylic acid having 4–11 carbon atoms, with the above ingredients (a), (b) and (c) being reacted in a molar ratio of 1:3:1;

Step (2), about 5–75% by weight of the esterification product prepared in Step (1) above is copolymerized with about 95–25% by weight ethylenically unsaturated monomers that have 2–16 carbon atoms per monomer unit but are different from said esterification product.

DESCRIPTION OF THE INVENTION

Preferably, the novel coating composition contains a polymer of about 20–50% by weight of the total weight of the polymer of the esterification product of Step (1) and more preferably, about 30% by weight of the esterification product of Step (1).

In a particularly preferred coating composition of this invention, the polymer is of maleic anhydride, a glycidyl ester in which $R^1$ is a tertiary aliphatic hydrocarbon radical of 8–10 carbon atoms and an aromatic dicarboxylic acid of the formula $R^5(COOH)_2$ in which $R^5$ is a divalent aromatic radical, preferably phenylene.

The polymer used to form the novel coating composition of this invention is prepared by forming an esterification product and copolymerizing this product without the monomers to form a polymer. The esterification product is prepared in Step (1) above by the reaction of an anhydride of an ethylenically unsaturated aliphatic dicarboxylic acid, a glycidyl ester and an aromatic dicarboxylic acid or a saturated aliphatic dicarboxylic acid. When this esterification product is polymerized with other ethylenically unsaturated monomers, it provides the resulting polymer with pendent ester groups that give a polymer, which when formed into a coating composition, the advantageous properties of hardness and scratch and mar resistance and the like. At least 5% and up to 75% by weight of the polymer must be attributed to the esterification product to provide the novel polymer with these advantageous properties.

An anhydride of an ethylenically unsaturated dicarboxylic acid is used as the basis for the esterified product since the esterification product is polymerized into the polymer backbone through the ethylenic unsaturation of this constituent. Anhydrides of the following unsaturated dicarboxylic acids are useful in this invention: maleic acid, itaconic acid, glutaconic acid, pyrocinchonic acid, zeronic acid and the like. Preferred anhydrides are maleic anhydride and itaconic anhydride since these are readily available and form products which have excellent adhesion hardness and scratch resistance.

The glycidyl ester constituent of the esterification product has the formula

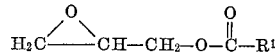

where $R^1$ is a saturated aliphatic hydrocarbon group containing 5 through 17 carbon atoms, or $R^1$ is an ethylenically unsaturated aliphatic hydrocarbon radical of 12 to 18 carbon atoms derived from a drying oil fatty acid.

Preferred for use because of the quality of the product obtained are glycidyl esters where $R^1$ is a tertiary saturated aliphatic hydrocarbon group of the structure

where $R^2$ is —$CH_3$ and $R^3$ and $R^4$ are alkyl groups of 1 through 12 carbon atoms.

One particularly preferred glycidyl ester of this group because it imparts acid and alkali resistance to the final product of this invention is a mixed glycidyl ester manufactured and sold by the Shell Chemical Company as "Cardura" E ester which is a glycidyl ester of a synthetic tertiary carboxylic acid having the general formula

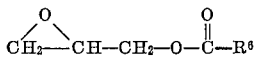

where $R^6$ is a tertiary aliphatic hydrocarbon group of 8 through 10 carbon atoms.

Air drying coating compositions of this invention are formed from polymers in which $R^1$ is an ethylenically unsaturated aliphatic hydrocarbon radical of 12 to 18 carbon atoms. This glycidyl ester is obtained by esterifying the acid chloride of one of the well known drying oil fatty acids, such as oleic acid, linoleic acid, linolenic acid, eleostearic acid and ricinoleic acid with glycidol. These acids are commonly found in tung oil, linseed oil, dehydrated castor oil and soya oil.

The preferred method for forming the above unsaturated glycidyl esters useful in this invention is to react the sodium salt of the fatty acid with epichlorohydrin. The reaction is as follows:

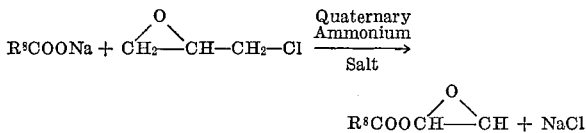

where $R^8$ is an aliphatic radical from one of the aforementioned drying oil fatty acids.

The third necessary constituent for forming the esterification product used to form the polymer for the novel coating composition is an aromatic dicarboxylic acid or a saturated aliphatic dicarboxylic acid can also be used. Useful aromatic dicarboxylic acids are phthalic acid terephthalic acid, isophthalic acid, uvitic acid, cumindic acid, tetrabromophthalic acid, tetrahydrophthalic acid and hexahydrophthalic acid. One preferred acid, because of its availability, is phthalic acid.

Typically useful saturated aliphatic dicarboxylic acids have the general formula $(CH_2)_n (COOH)_2$ where $n$ is from 2–9, and are, for example, succinic acid, glutaric acid, adipic acid, pimelic acid, suberic acid, azelaic acid, sebacic acid and brassic acid. Azelaic acid is preferred since it provides the resulting polymer with excellent properties, such as hardness and scratch resistance. Unsaturated aliphatic dicarboxylic acids that are not ethylenically unsaturated in the $\alpha,\beta$ position may also be used to form the esterification product used to form the polymer for the coating composition of this invention.

A wide variety of ethylenically unsaturated monomers can be polymerized with the esterification product and form a portion of the backbone of the polymer of this invention. In Step (2) in the formation of the novel polymer about 95–25% by weight of these monomer units are polymerized with the aforementioned esterified product to form the polymer used in the novel coating composition of this invention.

Preferably, the ethylenically unsaturated monomers that are used in Step (2) of the process for forming the polymers used in this invention have 2–16 carbon atoms per monomer. These monomers are available and polymerize by vinyl addition quite readily with the esterified monomeric product of Step (1) to form the polymer used in this invention. For example, blends of the following monomers can be used with the aforementioned esterification product to form the polymers used in this invention: alkyl esters of acrylic and methacrylic acid in which the alkyl group contains from 1–12 carbon atoms; vinyl chloride either plasticized or unplasticized, styrene, and the like. Typical examples of preferred monomers or blends of monomers are methyl methacrylate/ethyl acrylate, methyl methacrylate/acrylonitrile/methacrylic acid, acrylonitrile/methyl methacrylate, styrene/ethyl acrylate and styrene/methyl methacrylate.

Often it is desirable to form a coating composition of this invention from a polymer that contains reactive carboxyl groups since polymers with an acid number up to 40 are quite useful. To accomplish this, a copolymerizable ethylenically unsaturated carboxylic acid is polymerized into the polymer in Step (2); such as acrylic acid, methacrylic acid, crotonic acid, itaconic acid, maleic acid and the like.

Other preferred monomer compositions used in Step (2) are monomers of an $\alpha,\beta$-unsaturated monovinylidene monocarboxylic acid/methacrylic acid ester of a $C_1$–$C_4$ saturated aliphatic monohydric alcohol/an aromatic hydrocarbon having 1 or 2 vinylidene groups per molecule; for example, methyl methacrylate/styrene/acrylic acid. Another preferred monomer composition is an unsaturated monovinylidene monocarboxylic acid/methacrylic acid ester of a $C_1$–$C_8$ saturated monohydric alcohol, for example, butyl methacrylate/methacrylic acid, methyl methacrylate/itaconic acid. These compositions are preferred since they form polymers that are hard, durable and scratch resistant.

Coating compositions of this invention formed from polymers that have the following compositions are particularly preferred because of their excellent physical properties:

(1) 10–30% by weight styrene/20–40% by weight methacrylic acid/1–8% by weight acrylic acid/30–60% by weight of the esterification product of 1 mole maleic anhydride, 3 moles of "Cardura" E ester, 1 mole terephthalic acid;

(2) 35–60% by weight butyl methacrylate/1–5% by weight methacrylic acid/35–60% by weight of the esterified product of 1 mole maleic anhydride/3 moles "Cardura" E ester/1 mole azelaic acid; and (3) 30–50% by weight methyl methacrylate/1–5% itaconic acid, 45–65% by weight of the esterification product of 1 mole maleic anhydride/3 moles "Cardura" E ester and /1 mole succinic acid.

The method for forming the polymer used in this invention is to first form the esterification product and then copolymerize this esterification product with the monomers to form this novel polymer having ester groups pending from the backbone.

Preferably, in forming the esterification product, the aforementioned ingredients used in Step (1), (a), (b) and (c) are mixed with an inert solvent such as xylene, toluene and the like and the mixture is refluxed at about 125–275° C. and preferably, at about 200–250° C., in a reaction vessel. The trace amounts of water formed are removed and the reaction is continued until the desired acid number is obtained which is usually 3 or less. The low acid number indicates that the esterification reaction is complete.

The polymer used in this invention is then formed by blending the above prepared esterification product with the $C_2$–$C_{16}$ ethylenically unsaturated monomers in proportions selected to impart the desired physical properties of the product. This blend is dissolved in an inert solvent, such as xylene, toluene, or methyl ethyl ketone and a polymerization catalyst is added in a concentration of 1–4% by weight of the monomers. Typical catalysts are ditertiary butyl peroxide, cumene hydroperoxide, or azobisisobutyronitrile. The mixture is then refluxed at about 80–170° C., and more preferably at about 120–

140° C., until polymerization is complete. To determine when polymerization is complete, the polymer solids content or the viscosity of the mixture is measured. A constant viscosity of the mixture or a constant solids content indicates polymerization is complete.

The resulting polymer solution is suitable for direct use in the preparation of the novel coating composition of this invention. If the pure polymer is desired, it can be obtained by simply stripping the solvent from the solution, leaving behind a solid mass whose physical properties can range from resinous to crystalline, depending on the monomers and the preparation conditions used.

Coating compositions of this invention are prepared by blending the above polymers with such solvents as high solvency hydrocarbons, or with alcohols, esters, ketones or ethers, and, if desired, with pigments and modifying agents, such as plasticizers and fillers. Preferably, the novel coating composition of this invention is pigmented and contains about 10–50% by volume pigment. The novel coating composition is formed by the customary procedures of sand-grinding or ball-milling the polymer, pigment and a solvent to form a mill base and blending the mill base with solution of the polymer.

Novel thermosetting coating compositions especially suited for use as appliance enamels and the like can be made with the above polymer by adding from 5 to 60% by weight of the film-forming components of a thermosetting coating resin which can be a condensate of formaldehyde with melamine, urea, benzoguanamine, or a melamine/toluene sulfonamide. The addition of the thermosetting resins imparts improved hardness and solvent, alkali and heat resistance to the resulting finishes. These aforementioned resins can be prepared according to directions in U.S. Patents 2,197,357; 2,508,875 and 2,191,957.

Another composition of this invention which is a chemically inert coating is made by using from 5 to 50% by weight of the film-forming components, of a phenol-formaldehyde resin with the above polymers.

To coating compositions of this invention containing one of the above thermosetting resins, 5 to 30% by weight of the film-forming components, of an epoxy polyether condensate having a plurality of vic-epoxy moieties can be added. These condensates preferably contain at least one aliphatic hydroxyl moiety per molecule. Addition of such a resin to these coating compositions improves their metal adhesion, their flexibility and their corrosion resistance. These resins can be prepared according to directions in U.S. Patents 2,503,726; 2,592,560 and 2,694,694.

The aminoplast resins, phenol-formaldehyde resins and epoxy-polyether condensates can be added to the novel coating composition by simple blending techniques.

The novel coating compositions of this invention can be applied by brushing, flowcoating, dipping, handspraying, electrostatic spraying and the like. After application, the coatings are cured by baking at 100° C.–200° C. from 1–20 minutes.

The examples which follow illustrate the invention. All quantities shown are on a weight basis unless otherwise indicated.

Example 1

The following ingredients are reacted to form a polymer solution (hereinafter referred to as Polymer A solution):

Portion 1: Parts by weight
Terephthalic acid _____ 7.5
Maleic anhydride _____ 4.3
"Cardura" E glycidyl ester—a mixed ester which is the glycidyl ester of a synthetic tertiary carboxylic acid and has the formula

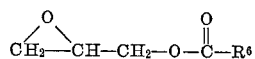

where $R_6$ is a tertiary aliphatic hydrocarbon group of 8–10 carbon atoms and is manufactured and sold by Shell Chemical Company __ 33.2

Portion 2:
Xylol _____ 59.0

Portion 3:
Styrene _____ 20.0
Methyl methacrylate _____ 30.0
Acrylic acid _____ 5.0
Di-tertiary butyl peroxide _____ 1.0

Portion 4:
Xylol _____ 20.0
Butanol _____ 20.0

Total _____ 200.0

The first portion is premixed and charged into a reaction vessel and heated to 160° C. The heat source is removed from the vessel and the exothermic reaction is continued until the temperature of the ingredients in the vessel begins to lower. The mixture is then heated to 200° C. and maintained at this temperature until the mixture reaches an acid number of 3 or below. The mixture is cooled to 140° C. and Portion 2 is added and this mixture is then heated to its reflux temperature. Portion 3 is premixed and added to the reaction mixture over a 3-hour period while maintaining the mixture at its reflux temperature. Portion 4 is then added to the mixture and this mixture is refluxed for about 3 hours until a constant viscosity is reached.

Polymer A solution has a polymer solids content of about 40% by weight, a Gardner Holt viscosity of about W, an acid number of 39 and weighs about 8.14 pounds/gallon.

Polymer A has the following composition:

| | Weight percent |
|---|---|
| Styrene units | 20.0 |
| Methyl methacrylate units | 30.0 |
| Acrylic acid units | 5.0 |
| Maleic anhydride units | 4.3 |
| "Cardura" E glycidyl ester units | 33.2 |
| Terephthalic acid units | 7.5 |
| Total | 100.0 |

The following coating composition is prepared by forming a mill base and blending this mill base with Polymer A solution and a melamine-formaldehyde resin:

Mill base A: Parts by weight
Titanium dioxide pigment (rutile) _____ 60
Polymer A solution (50% polymer solids) _____ 20
Xylol _____ 20

Total _____ 100

The above ingredients are blended together using a conventional sand-grinding process and the ingredients are ground to about a 0.5 mil fineness.

The thermosetting paint is formed by blending the following ingredients:

Parts by weight
Mill base A _____ 150
Polymer A solution (50% polymer solids) _____ 90
Melamine-formaldehyde resin (55% resin solids in butanol) _____ 73
Butyl Cellosolve _____ 4

Total _____ 317

The resulting paint has a solids content of 60% by weight, a pigment to binder ratio of 90/100 and a weight ratio of Polymer A to melamine-formaldehyde resin of 60/40.

The paint is reduced to about a 25% solids content with xylol and sprayed on a steel plate primed with "Epon" 1007 which is an epoxy resin manufactured by Shell Chemical Company that has an epoxide equivalent of 2000–2500 and an equivalent weight of 200. The coating is baked for 15 minutes at about 220° C. The resulting coating is about 1.5 mils thick and is firmly bonded to the substrate. The coated steel substrate can be flexed without damaging the coating and the coating is resistant to damage by heat, chemical and food stains. The coating has excellent scratch resistance, i.e., a pencil of a 9H hardness will not mar or scratch the coating. The hardness of the coating is 25–30 knoops as measured by the Tukon hardness test ASTM D–1474 using a 25 gram load applied to a standard Tukon tester.

Example 2

The following ingredients are reacted to form a polymer solution (Polymer B solution):

| | Parts by weight |
|---|---|
| Portion 1: | |
| Azelaic acid | 9.05 |
| Maleic anhydride | 4.75 |
| "Cardura" E glycidyl ester (described in Example 1) | 36.20 |
| Portion 2: | |
| Xylol | 79.00 |
| Butanol | 20.00 |
| Portion 3: | |
| Butyl methacrylate | 48.00 |
| Methacrylic acid | 2.00 |
| t-Butyl peracetate | 1.00 |
| Total | 200.00 |

The first portion is premixed and charged into a reaction vessel and heated to 140° C. The heat source is removed from the vessel and the exothermic reaction is continued until the temperature of the ingredients in the vessel begins to lower. The mixture is then heated to 200° C. and maintained at this temperature until the mixture reaches an acid number of 1 or below. The mixture is then cooled to 140° C. and Portion 2 is then added and the mixture is heated to its reflux temperature. Portion 3 is premixed and added to the mixture over a 1-hour period while the mixture is held at its reflux temperature. The mixture is maintained at its reflux temperature for an additional 4–6 hours to complete the reaction.

The resulting Polymer B solution has a polymer solids content of 50% by weight and an acid number of 15.

Polymer B has the following composition:

| | Weight percent |
|---|---|
| Butyl methacrylate units | 48.00 |
| Methacrylic acid units | 2.00 |
| Maleic anhydride units | 4.75 |
| Azelaic acid units | 9.05 |
| "Cardura" E glycidyl ester units | 36.20 |
| Total | 100.00 |

The following coating composition is prepared by forming a mill base and blending this mill base with Polymer B solution and a urea-formaldehyde resin.

| Mill base B: | Parts by weight |
|---|---|
| Titanium dioxide pigment (rutile) | 60 |
| Polymer B solution (50% polymer solids) | 20 |
| Xylol | 20 |
| Total | 100 |

The above ingredients are blended together using a conventional sand-grinding process and the ingredients are ground to about a 0.5 fineness.

The thermosetting paint is formed by blending the following ingredients:

| | Parts by weight |
|---|---|
| Mill base B | 150 |
| Polymer B solution (50% polymer solids) | 90 |
| Urea-formaldehyde resin (60% resin solids in butanol) | 67 |
| Butyl Carbitol | 4 |
| Total | 311 |

The resulting paint has a solids content of 55% by weight, a pigment to binder ratio to 90/100 and a weight ratio of Polymer B to urea-formaldehyde resin of 70/30.

The paint is reduced to about a 25% solids content with toluol and sprayed on an unprimed aluminum plate and the coating is baked for 15 minutes at about 215° C. The resulting coating is about 1.0 mil thick and is firmly bonded to the aluminum substrate. The coated aluminum substrate can be flexed without damaging the coating and the coating is resistant to damage by heat, chemicals and to food stains. The coating exhibited an H–2H pencil hardness and a Tukon hardness (ASTM D–1474) of 20 knoops.

Example 3

The following ingredients are reacted to form a polymer solution (Polymer C solution)—

| | Parts by weight |
|---|---|
| Portion 1: | |
| Succinic acid | 7.00 |
| Maleic anhydride | 5.88 |
| "Cardura" E glycidyl ester (described in Example 1) | 45.12 |
| Portion 2: | |
| Methyl isobutyl ketone | 98.00 |
| Methyl methacrylate | 40.00 |
| Itaconic acid | 2.00 |
| Cumene hydroperoxide | 2.00 |
| Total | 200.00 |

The first portion is premixed and charged into a reaction vessel and heated to 140° C. The heat source is removed from the vessel and the exothermic reaction is continued until the temperature of the ingredients in the vessel begins to lower. The mixture is then heated to 200° C. and maintained at this temperature until the mixture reaches an acid number of 1 or below. The mixture is then cooled to 140° C. and Portion 2 is added and the mixture is then heated to its reflux temperature. Portion 3 is premixed and added to the mixture over a 1-hour period while the mixture is held at its reflux temperature. The mixture is maintained at its reflux temperature for an additional 4–6 hours to complete the reaction. The resulting Polymer C solution has a polymer solids content of 50% by weight and an acid number of 12.

Polymer C has the following composition:

| | Parts by weight |
|---|---|
| Methyl methacrylate units | 40.00 |
| Itaconic acid units | 2.00 |
| Maleic anhydride units | 5.88 |
| Succinic acid units | 7.00 |
| "Cardura" E glycidyl ester units | 45.12 |
| Total | 100.00 |

The following coating composition is prepared by forming a mill base and blending this mill base with Polymer C solution and a benzoguanamine-formaldehyde resin—

| Mill base C: | Parts by weight |
|---|---|
| Titanium dioxide pigment (dutile) | 60 |
| Polymer C solution (50% polymer solids) | 20 |
| Xylol | 20 |
| Total | 100 |

The above ingredients are blended together using a conventional sand-grinding process and the ingredients are ground to about a 0.4 mil fineness.

The thermosetting paint is formed by blending the following ingredients:

| | Parts by weight |
|---|---|
| Mill base C | 150 |
| Polymer C solution (50% polymer solids) | 90 |
| Benzoguanamine-formaldehyde resin (66% resin solids in butanol) | 61 |
| Xylol | 27 |
| Total | 328 |

The resulting paint has a solids content of 58% by weight, a pigment to binder ratio of 90/100 and a weight ratio of Polymer C to benzoguanamine-formaldehyde resin of 60/40.

The paint is reduced to about a 25% solids content with xylol and sprayed on an unprimed steel substrate and baked for 30 minutes at 180° C. The resulting coating is about 1.0 mil thick and is firmly bonded to the steel substrate. The coated steel substrate can be flexed without damaging the coating and the coating is resistant to damage by heat, chemicals and food stains. The coating has a pencil hardness of about 3H and a Tukon hardness (ASTM–D–1474) of about 20 knoops.

I claim:
1. A coating composition containing 10–90% by weight polymer solids and a solvent for the polymer, said polymer having ester groups pending from the polymer backbone and being formed by a method which consists essentially of
   (1) preparing an esterification product by reacting
      (a) an anhydride of an ethylenically unsaturated dicarboxylic acid having 4–6 carbon atoms,
      (b) a glycidyl ester of the formula

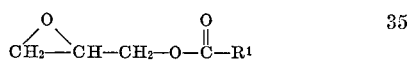

wherein $R^1$ is an alkyl radical having 5–17 carbon atoms or an ethylenically unsaturated aliphatic hydrocarbon radical having 12–18 carbon atoms,
      (c) an aromatic dicarboxylic acid or a saturated aliphatic dicarboxylic acid having 4–11 carbon atoms, said (a), (b) and (c) reacted in a molar ratio of 1:3:1;
   (2) copolymerizing 5–75% by weight of said esterification product with 95–25% by weight of an ethylenically unsaturated monomer different from said esterification product and having about 2–16 carbon atoms.
2. The coating composition of claim 1 in which the esterification product of said polymer comprises about 20–50% of the total weight of the polymer.
3. The coating composition of claim 1 in which $R^1$ is a tertiary aliphatic hydrocarbon radical of the structure

wherein $R^2$ is methyl and $R^3$ and $R^4$ are alkyl groups of 1–12 carbon atoms.
4. The coating composition of claim 1 in which $R^1$ is a tertiary aliphatic hydrocarbon group of 8–10 carbon atoms.
5. The coating composition of claim 1 in which the anhydride is maleic anhydride.
6. The coating composition of claim 1 in which the aromatic dicarboxylic acid has the formula of

in which $R^5$ is an aromatic divalent radical.
7. The coating composition of claim 6 in which $R^5$ is a phenylene radical.
8. The coating composition of claim 1 in which the aromatic dicarboxylic acid is terephthalic acid.

9. The coating composition of claim 1 in which the ethylenically unsaturated monomers consist essentially of monomers of an $\alpha,\beta$-unsaturated monovinylidene monocarboxylic acid, an aromatic hydrocarbon having from 1 or 2 vinylidene groups per molecule and a methacrylic acid ester of a $C_1$–$C_4$ saturated aliphatic monohydric alcohol.
10. The coating composition of claim 1 in which
   (1) the esterification product is formed by reacting maleic anhydride, a glycidyl ester of the formula

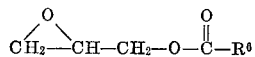

in which $R^6$ is a tertiary aliphatic hydrocarbon group of 8–10 carbon atoms and terephthalic acid in a molar ratio of 1:3:1; and
   (2) the ethylenically unsaturated monomers are styrene, methyl methacrylate and acrylic acid.
11. The coating composition of claim 1 in which the ethylenically unsaturated monomers consist essentially of monomers of an $\alpha,\beta$-unsaturated monovinylidene monocarboxylic acid and a methacrylic acid ester of $C_1$–$C_4$ saturated aliphatic monohydric alcohol.
12. The coating composition of claim 1 in which
   (1) the esterification product is formed by the reaction of maleic anhydride, a glycidyl ester of the formula

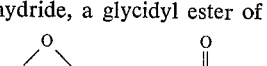

in which $R^6$ is a tertiary aliphatic hydrocarbon group of 8–10 carbon atoms and azelaic acid in a molar ratio of 1:3:1; and
   (2) the ethylenically unsaturated monomers are butyl methacrylate and methacrylic acid.
13. The coating composition of claim 1 in which
   (1) the esterification product is formed by reacting maleic anhydride, a glycidyl ester of the formula

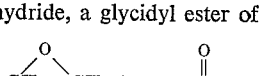

in which $R^6$ is a tertiary aliphatic hydrocarbon group of 8–10 carbon atoms and succinic acid in a molar ratio of 1:3:1; and
   (2) the ethylenically unsaturated monomers are methyl methacrylate and itaconic acid.
14. The coating composition of claim 1 containing 10–50% by volume pigment.
15. The coating composition of claim 14 containing from 10–60% by weight of a thermosetting nitrogen containing resin.
16. The coating composition of claim 15 in which the thermosetting resin is melamine-formaldehyde.
17. The coating composition of claim 15 in which the thermosetting resin is urea-formaldehyde.
18. The coating composition of claim 15 in which the thermosetting resin is benzoguanamine-formaldehyde.
19. The coating composition of claim 14 containing about 5–50% by weight of a thermosetting phenol-formaldehyde resin.

References Cited

UNITED STATES PATENTS

| 3,002,959 | 10/1961 | Hicks | 260—851 |
| 3,178,454 | 4/1965 | Kloos et al. | |
| 3,270,088 | 8/1966 | Hicks | 260—851 |
| 3,330,814 | 7/1967 | Vasta | 260—851 |
| 3,338,860 | 8/1967 | Vasta | 260—851 |

MURRAY TILLMAN, Primary Examiner

JOHN C. BLEUTGE, Assistant Examiner

U.S. Cl. X.R.

117—161; 260—32.8, 33.2, 33.4, 33.6, 41, 844, 848, 851, 855, 856, 78.4, 78.5, 17, 836, 837, 901